US008757123B2

(12) United States Patent
Hofbauer

(10) Patent No.: US 8,757,123 B2
(45) Date of Patent: Jun. 24, 2014

(54) BALANCING AN OPPOSED-PISTON, OPPOSED-CYLINDER ENGINE

(71) Applicant: EcoMotors, Inc., Allen Park, MI (US)

(72) Inventor: Peter Hofbauer, West Bloomfield, MI (US)

(73) Assignee: EcoMotors, Inc., Allen Park, MI (US)

( * ) Notice: Subject to any disclaimer, the term of this patent is extended or adjusted under 35 U.S.C. 154(b) by 0 days.

(21) Appl. No.: 13/654,474

(22) Filed: Oct. 18, 2012

(65) Prior Publication Data

US 2013/0098328 A1 Apr. 25, 2013

Related U.S. Application Data

(60) Provisional application No. 61/549,678, filed on Oct. 20, 2011.

(51) Int. Cl.
*F16F 15/00* (2006.01)
*F02B 75/06* (2006.01)

(52) U.S. Cl.
USPC ......... 123/192.2; 123/53.6; 123/58.1; 74/603

(58) Field of Classification Search
USPC ........... 123/192.2, 192.1, 51 R, 51 A, 51 AA, 123/51 AC; 74/595, 603, 604
See application file for complete search history.

(56) References Cited

U.S. PATENT DOCUMENTS

| | | | | | |
|---|---|---|---|---|---|
| 655,475 | A * | 8/1900 | Calloch | 123/51 R |
| 1,595,785 | A * | 8/1926 | Jackson | 74/604 |
| 4,730,512 | A * | 3/1988 | Ito et al. | 74/595 |
| 5,481,942 | A * | 1/1996 | Baek | 74/603 |
| 6,164,259 | A * | 12/2000 | Brogdon et al. | 123/192.2 |
| 6,170,443 | B1 * | 1/2001 | Hofbauer | 123/51 B |
| 6,427,657 | B1 * | 8/2002 | Egleston | 123/192.2 |
| 6,959,683 | B2 * | 11/2005 | Gokan | 123/192.1 |
| 7,367,303 | B2 * | 5/2008 | Yamamoto et al. | 123/192.1 |
| 7,434,550 | B2 * | 10/2008 | Hofbauer | 123/51 R |
| 7,469,664 | B2 * | 12/2008 | Hofbauer et al. | 123/54.1 |
| 8,127,736 | B2 * | 3/2012 | Lee et al. | 123/192.2 |
| 2012/0207415 | A1 | 8/2012 | Hofbauer | |

FOREIGN PATENT DOCUMENTS

| | | | | |
|---|---|---|---|---|
| DE | 3343771 A1 * | 6/1985 | F01M 1/02 |
| GB | 635167 A | 4/1950 | |

* cited by examiner

*Primary Examiner* — Noah Kamen
*Assistant Examiner* — Grant Moubry
(74) *Attorney, Agent, or Firm* — Diana D. Brehob

(57) ABSTRACT

An opposed-piston, opposed-cylinder engine in which the intake and exhaust pistons are symmetrically arranged has a small inertial force imbalance in the direction of reciprocation of the pistons. A center of gravity of the crankshaft can be displaced from the axis of rotation to at least partially overcome this imbalance. Such counterweighting of the crankshaft cancels a portion of the inertial balance due to the pistons but introduces an inertial imbalance in an orthogonal direction with respect to the piston-induced imbalance. By providing additional counterweights on pulleys rotating at the same speed, but the opposite direction, as the crankshaft, the imbalance can be substantially eliminated to yield substantially a perfectly-balanced engine.

19 Claims, 11 Drawing Sheets

FIG. 12
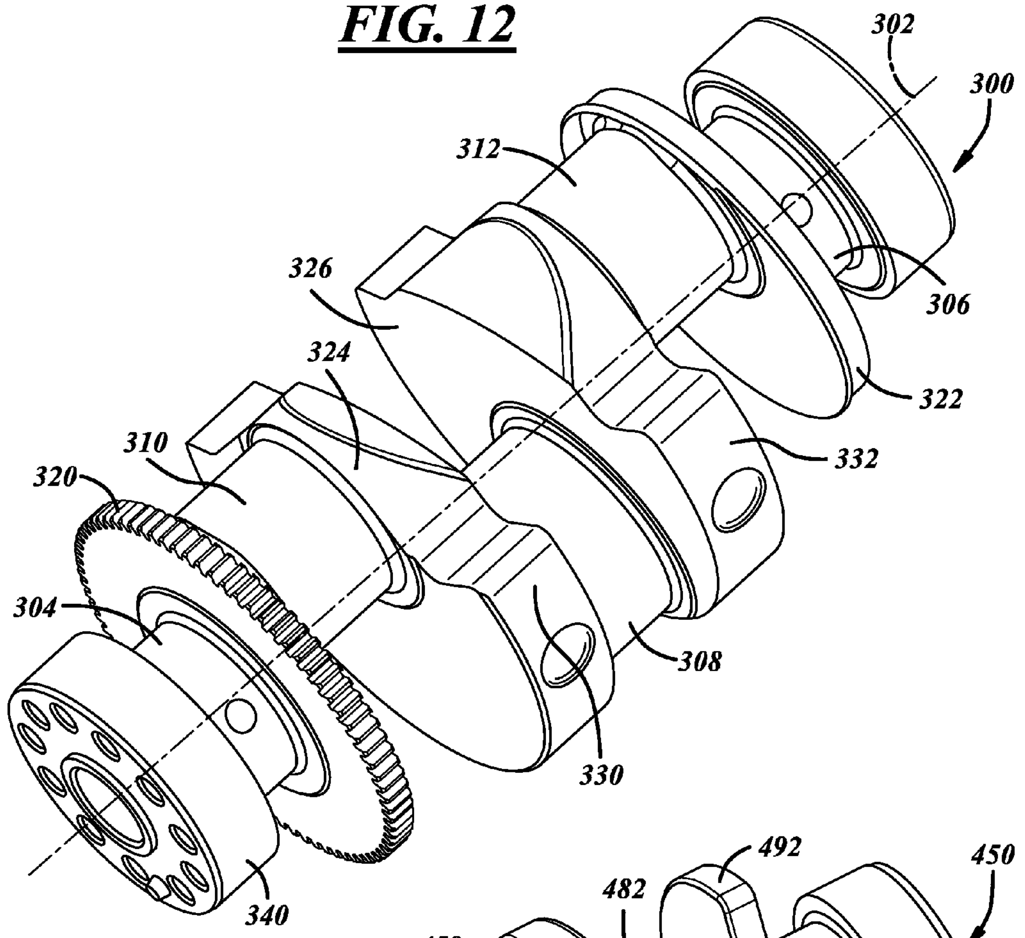
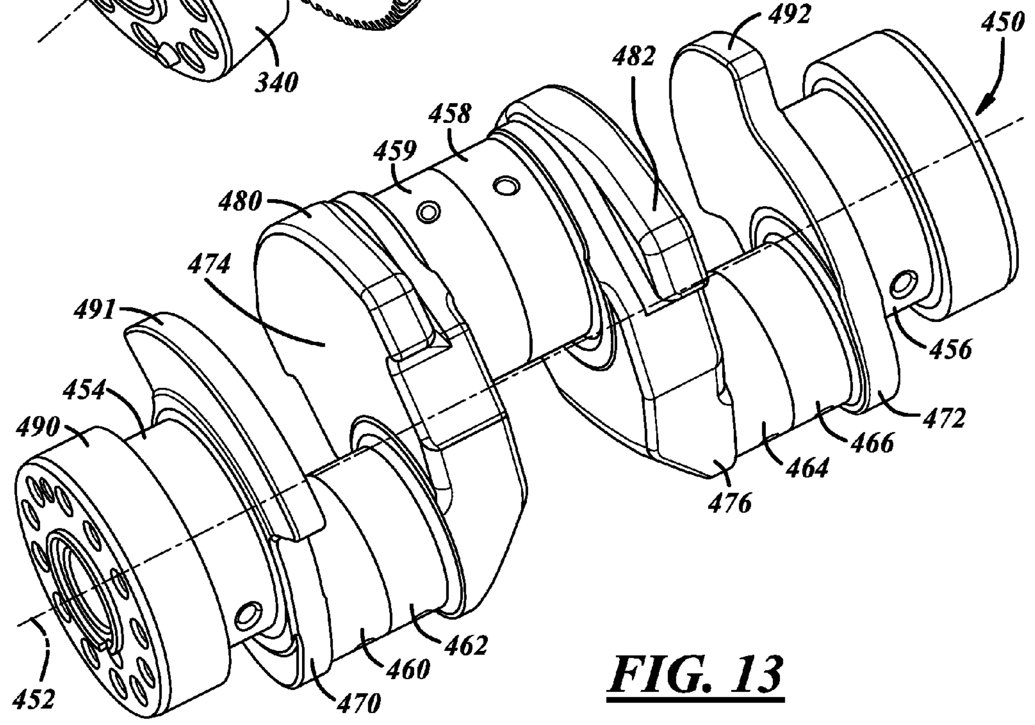
FIG. 13

BALANCING AN OPPOSED-PISTON, OPPOSED-CYLINDER ENGINE

CROSS REFERENCE TO RELATED APPLICATIONS

The present application claims priority benefit from U.S. provisional patent application 61/549,678 filed 20 Oct. 2011.

FIELD

The present disclosure relates to balancing an internal combustion engine.

BACKGROUND

An opposed-piston, opposed-cylinder (OPOC) engine 10, as disclosed in U.S. Pat. No. 6,170,443, and incorporated herein in its entirety, is an asymmetrical configuration. Such an OPOC engine 10 is shown isometrically in FIG. 1. A first intake piston 12' is the inner piston in one of the cylinders and a second intake piston 12 is the outer piston in the other cylinder. A first intake piston 12 and a first exhaust piston 14 reciprocate within a first cylinder; and a second intake piston 12' and a second exhaust piston 14' reciprocate with a second cylinder (cylinders not shown to facilitate viewing pistons). Exhaust piston 14 and intake piston 12' couple to a journal (not visible) of crankshaft 20 via pushrods 16 (only one of which is visible). Intake piston 12 and exhaust piston 14' couple to two journals (not visible) of crankshaft 20 via pullrods 18, with each of intake piston 12 and exhaust piston 14' having two pullrods 18. Because the pullrods and pushrods sit adjacent to each other, a central axis 22' of the left cylinder is parallel to, but offset from a central axis 22 of the right cylinder.

The movement of the intake pistons is displaced from the movement of the exhaust pistons such that the exhaust pistons precede the intake pistons in attaining their respective extreme positions by about 20 degrees. This is accomplished by asymmetrically orienting the eccentric journals on crankshaft 20 to which the pistons couple. By asymmetrically orientating the journals on crankshaft 20, the scavenging events are asymmetrically timed. The inertia forces, at a given engine speed, arising in the direction of reciprocation, X, is illustrated in FIG. 2 with the forces due to the outer pistons shown as dashed curve 70 and the forces due to the inner pistons shown as dash-dot-dot curve 72. The remaining inertia forces for all four pistons are shown as solid curve 74. If the timing of the pistons were not offset, there would be substantially no remaining imbalance. Even with the offset, though, the remaining imbalance is modest and much smaller than conventional engines, as will be discussed later in regards to FIG. 5A.

Although the balancing is nearly perfect for the engine of FIG. 1, such engine configuration does present a few disadvantages. In the process of optimizing the combustion chamber shape it is highly likely that the exhaust piston and the intake piston have different combustion chamber shapes. Furthermore, it is clear in FIG. 1, that the inner pistons and the outer pistons are distinct by their method of coupling to the crankshaft. Thus as inner and outer pistons are necessarily unique and intake and exhaust pistons are likely to be unique, engine 10 in FIG. 1 has four separate pistons: intake inner, intake outer, exhaust inner, and exhaust outer. To limit the number of individual parts for an engine assembly; it is desirable for the pistons to be arranged symmetrically, e.g., exhausts being inner pistons and intakes being outer pistons or vice versa. Also, the plumbing of the intake and exhaust is somewhat complicated in engine 10 (FIG. 1) due to an intake located between the two exhausts. Additionally, by having an inner intake piston and an inner exhaust piston coupling to the crankshaft adjacent to each other, the journals are split-pin type, i.e., they are not collinear with respect to each other, thereby requiring a small spacing between them making the engine wider and requiring additional strengthening measures.

SUMMARY

To at least partially overcome imbalance in an opposed-piston engine, an engine is disclosed that has a first cylinder having a central axis, a second cylinder having a central axis parallel to the central axis of the first cylinder, a unitary crankshaft situated between the two cylinders and having at least five journals and four webs: a front main journal having a central axis collinear with an axis of rotation of the crankshaft; a rear main journal having a central axis collinear with the axis of rotation of the crankshaft; a central eccentric journal; a front eccentric journal between the front main journal and the central eccentric journal; a rear eccentric journal between the rear main journal and the central eccentric journal; a front outer web located between the front main journal and the front eccentric journal; a front inner web located between the front eccentric journal and the central eccentric journal; a rear inner web located between the central eccentric journal and the rear eccentric journal; a rear outer web located between the rear eccentric journal and the rear main journal. A central axis of the front and rear eccentric journals is offset from the axis of rotation by an outer crank throw. A central axis of the central journal is offset from the axis of rotation by an inner crank throw. The front and rear eccentric journals are substantially equally phased. The central eccentric journal is asymmetrically phased with respect to the front. A first piston is disposed in the first cylinder and coupled to the central eccentric journal via a first pushrod. A second piston is disposed in the second cylinder and coupled to the central eccentric journal via a second pushrod. A third piston is disposed in the first cylinder and coupled to the front eccentric journal via a first pullrod and coupled to the rear eccentric journal via a second pullrod. A fourth piston is disposed in the second cylinder and coupled to the front eccentric journal via a third pullrod and coupled to the rear eccentric journal via a fourth pullrod. Reciprocation of the pistons, the pushrods, and the pullrods generates an unbalanced inertia. The front inner web includes a first counterweight. The rear inner web includes a second counterweight. The first and second counterweights cause the center of gravity to be displaced from the axis of rotation of the crankshaft to at least partially counteract the unbalanced inertia force. The first and second counterweights are situated to provide clearance between the counterweights and the first and second pistons at all crankshaft positions.

In some embodiments, the first and second counterweights counteract approximately half of the unbalanced inertia force. In other embodiments, the front outer web includes a third counterweight and the rear outer web includes a fourth counterweight. The center of gravity of the crankshaft is displaced from the central axis due to the first, second, third, and fourth counterweights; the displacement of the center of gravity is situated to overcome approximately half of the inertia force.

Each of the first and second cylinders has a plurality of intake ports and a plurality of exhaust ports. The first and second pistons are exhaust pistons arranged to reciprocate when the crankshaft rotates thereby covering and uncovering the exhaust ports. The third and fourth pistons are intake pistons arranged to reciprocate when the crankshaft rotates thereby covering and uncovering the intake ports. The first and second pistons weigh less than the third and fourth pistons. The outer crank throw is shorter than the inner crank throw such that (the mass of first piston plus a translatory component of the mass of the pushrod) times the outer crank throw is substantially equal to (the mass of the third piston plus a translatory component of the mass of the first and second pullrods) times the inner crank throw.

In some embodiments, the first and second cylinder central axes are substantially collinear and the center of gravity of the crankshaft is located substantially on a plane perpendicular to the axis of rotation of the crankshaft that includes the central axes of the two cylinders. Such embodiments have pairs of pushrods and pairs of pullrods with each pair coupling to a single journal. Alternatively, the pushrod pair or the pullrod pairs couple to the crankshaft adjacent to each other. In such embodiments, the central axes of the first and second cylinders are displaced from each other.

The inner eccentric journal is eccentric from the axis of the axis of rotation of the crankshaft by an inner crank throw; and the outer eccentric journal is eccentric from the axis of the axis of rotation of the crankshaft by an outer crank throw. An inner reciprocating mass is a mass of the first piston plus a translatory component of mass attributable to the first pushrod; an outer reciprocating mass is a mass of the third piston plus a translatory component of mass attributable to the first pullrod plus a translatory component of mass attributable to the second pullrod. The inner reciprocating mass times the inner crank throw is roughly equal to the outer reciprocating mass times the outer crank throw. A first-order unbalanced inertia force during rotation of the engine is due to asymmetric phasing of the pistons which is due to asymmetric phasing between the inner journal and the outer journal. The displacement of the center of gravity of the crankshaft due to the counterweights is determined to cancel approximately half of the first-order unbalanced inertia force.

In some embodiments, the engine has at least one accessory coupled to the engine with a shaft of the accessory parallel to the crankshaft and the shaft of the accessory rotating in an opposite direction with respect to the crankshaft at the same rotational speed as the crankshaft. The accessory has at least one counterweight coupled to the accessory. The counterweight on the accessory has a mass and a location with respect to the axis of rotation of the accessory canceling a portion of the unbalanced inertia force due to the pistons.

The engine, in some alternatives, has crankshaft pulley coupled to the crankshaft, an accessory pulley counter rotating at the same speed as the crankshaft pulley with the crankshaft pulley and the accessory pulley engaged via a flexible member, an accessory shaft and an accessory coupled to and rotating with the accessory pulley; and a counterweight coupled to the accessory shaft. A serpentine member couples with the crankshaft and a pulley coupled to the accessory. The serpentine member is one of a toothed belt and a chain. The accessory may be an oil pump, a water pump, an alternator, a fuel pump, an air conditioning compressor, and an air pump.

Also disclosed is an engine system having a crankshaft with at least five journals and four webs: a front main journal having a central axis collinear with an axis of rotation of the crankshaft, a rear main journal having a central axis collinear with the axis of rotation of the crankshaft, a central eccentric journal, a front eccentric journal between the front main journal and the central eccentric journal, a rear eccentric journal between the rear main journal and the central eccentric journal, a front outer web located between the front main journal and the front eccentric journal, a front inner web located between the front eccentric journal and the central eccentric journal, a rear inner web located between the central eccentric journal and the rear eccentric journal, and a rear outer web located between the rear eccentric journal and the rear main journal. The engine has a first cylinder having a first piston reciprocating therein with the first piston coupled to the crankshaft via a first connecting rod and a second cylinder having a second piston reciprocating therein with the second piston coupled to the crankshaft via a second connecting rod. The engine further includes a third piston reciprocating in the first cylinder with the third piston coupled to the crankshaft via third and fourth connecting rods and a fourth piston reciprocating in the second cylinder with the fourth piston coupled to the crankshaft via fifth and sixth connecting rods. The crankshaft further includes a first counterweight applied to the front inner web and a second counterweight applied to the rear inner web.

Reciprocation of the pistons leads to unbalanced inertia forces perpendicular to the axis of rotation of the crankshaft. The first and second counterweights cause the center of gravity of the crankshaft to be displaced in such a manner to counteract at least a portion of the unbalanced inertia forces. A primary accessory counter rotating at crankshaft speed and coupled to the engine has a third counterweight coupled thereto. The third counterweight causes center of gravity of the primary accessory to be displaced from an axis of rotation of the primary accessory. The engine may also have a secondary accessory coupled to the engine with the secondary accessory counter rotating at crankshaft speed and having a fourth counterweight associated with the secondary accessory. The fourth counterweight causes center of gravity of the secondary accessory to be displaced from an axis of rotation of the secondary accessory. The first and second counterweights counteract about half of the unbalanced force. The first and second counterweights, however, lead to an imbalance in a direction perpendicular to both the axis of the first cylinder and the axis of rotation of the crankshaft. The third and fourth counterweights counteract about half of the unbalanced force due to the pistons and the translatory component of the connecting rods as well as counteracting the imbalance created by the first and second counterweights.

The engine system may further include a crankshaft pulley coupled to the crankshaft, a serpentine member wrapped around a portion of the crankshaft pulley, a first rotating accessory having an axis of rotation parallel to an axis of rotation of the crankshaft and a first accessory pulley engaged with the serpentine member, a second rotating accessory having an axis of rotation parallel to the axis of rotation of the crankshaft and a second accessory pulley engaged with the serpentine member, a third counterweight coupled to the first rotating accessory, and a fourth counterweight coupled to the second rotating accessory.

The engine system includes a cylinder block housing first and second cylinders in which first and second pistons reciprocate, a driving gear associated with the crankshaft, a driven gear engaging with the driving gear with the driven gear having the same number of teeth as the driving gear, an accessory shaft and an accessory coupled to and rotating with the driven gear, and a third counterweight coupled to the accessory shaft. The accessory shaft associated with the accessory is supported on a first end by a first bearing in a first side of the cylinder block and is supported on a second end by a second bearing in a second side of the cylinder block. The third counterweight is located between the two bearings.

In some embodiments, central axes of the first and second cylinders are displaced from each other. The first and second connecting rods are pushrods that couple to the crankshaft adjacent to each other. The third and fourth connecting rods are pullrods that couple to the crankshaft adjacent to each other. The fifth and sixth connecting rods are pullrods that couple to the crankshaft adjacent to each other. The central eccentric journal has two journal portions: one to which the first connecting rod couples and one to which the second connecting rod couples. The front eccentric journal includes two journal portions: one to which the third connecting rod couples and one to which the fourth connecting rod couples. The rear eccentric journal has two journal portions: one to which the fifth connecting rod couples and one to which the sixth connecting rod couples.

In some embodiments, a crankshaft pulley is coupled to the crankshaft. An accessory pulley counter rotating at the same speed as the crankshaft pulley with the accessory pulley driven by the crankshaft accessory pulley via a flexible member. An accessory shaft and an accessory are coupled to and rotating with the accessory pulley. A second counterweight is further coupled to the accessory shaft.

A method to balance an OPOC engine is also disclosed that includes: determining the mass of pistons disposed in engine cylinders and the translatory component of the connecting rods associated with the pistons, determining the unbalanced piston inertia force, F, along the cylinder axis at a predetermined engine speed, and specifying a counterweight force, F_CS, associated with the crankshaft to counteract a fraction of the unbalanced piston inertia forces. The fraction that the crankshaft counterweight(s) overcome is approximately one-half, is one embodiment. The engine system also may have rotating accessories associated with the engine. The method also includes determining offsets (x_1, x_2, y_1, y_2, z_1, and z_2) at which first and second counterweights may be provided on engine accessories, such offsets being those that prevent collision between the counterweights and other engine components. The forces of the first and second counterweights, F_1 and F_2, provided on accessories at least partially based on force balances on the crankshaft. Once F_1 and F_2 are known, the masses can be backed out via the offset that have already been defined.

BRIEF DESCRIPTION OF THE DRAWINGS

FIG. 12 is an isometric view of a crankshaft;

FIG. 13 isometrically illustrates an alternative embodiment of a crankshaft rotating about an axis;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
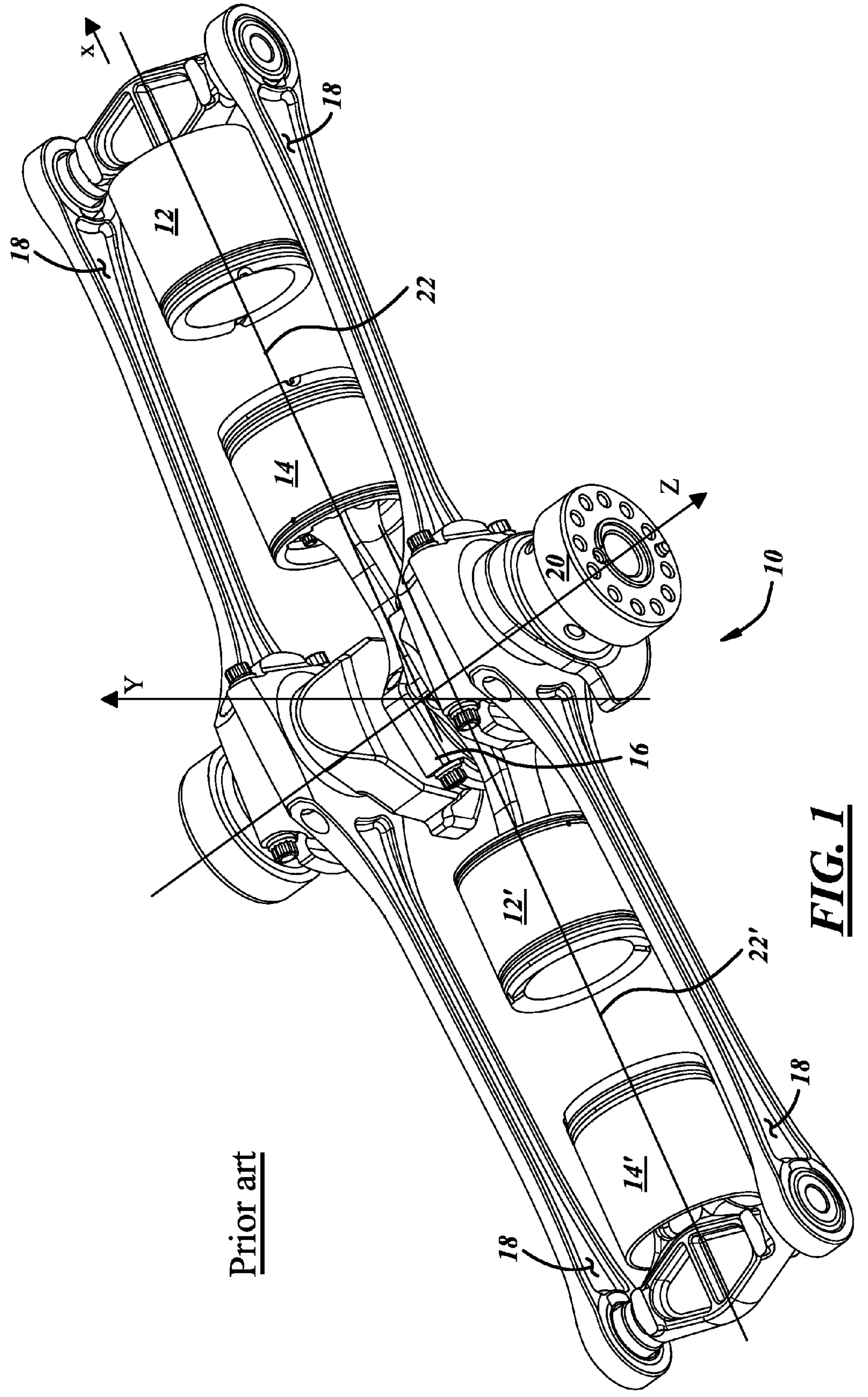
FIG. 1 Prior art
FIG. 1 is an isometric view of an OPOC engine in which the intake and exhaust pistons are asymmetrically arranged.
Figure 2:
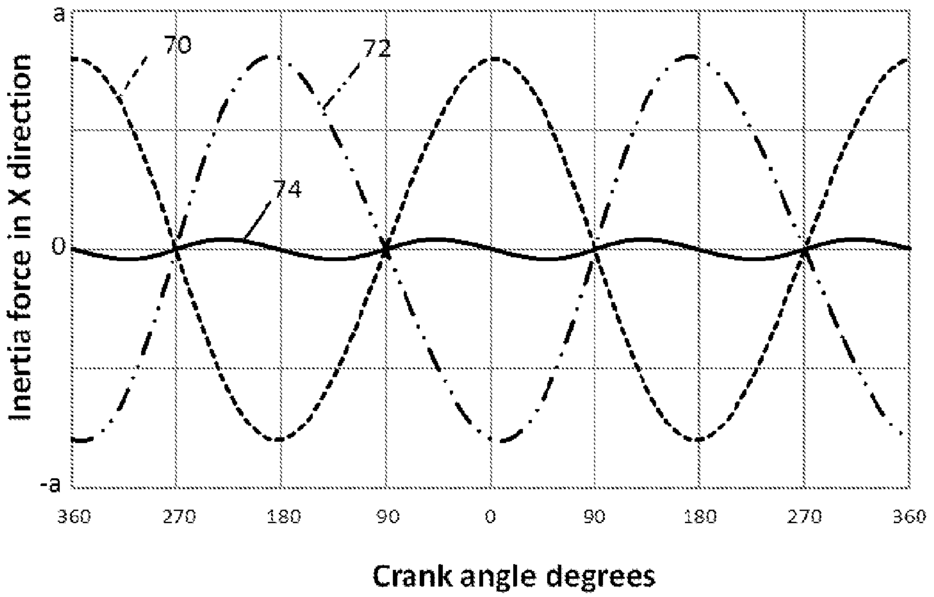
Fig. 2 Prior art
FIG. 2 is a graph of inertia forces due to the reciprocation of the pistons in the OPOC engine of FIG. 1.
Figure 3:
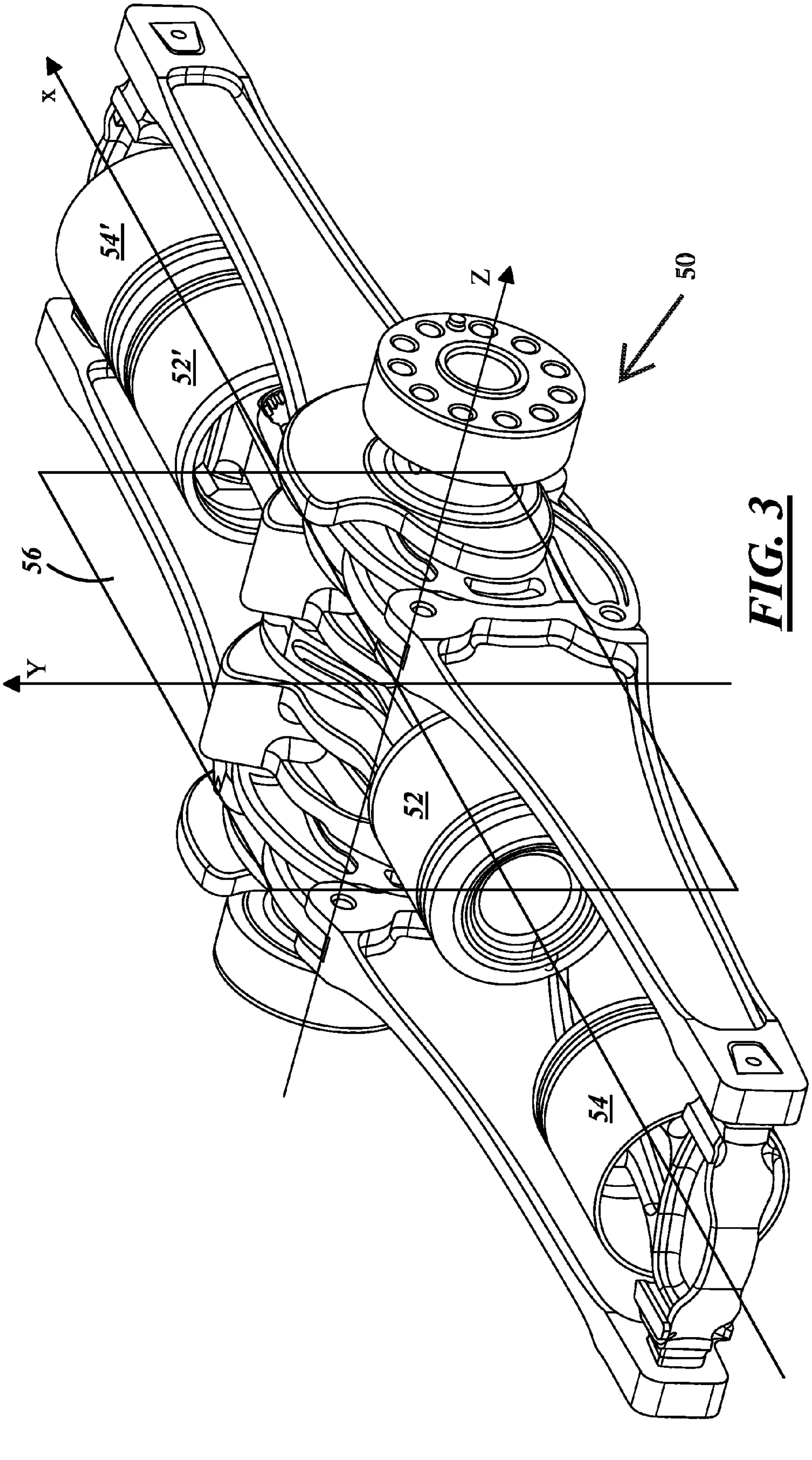
FIG. 3 is an isometric view of an OPOC engine in which the intake and exhaust pistons are symmetrically arranged.

In FIG. 3, an OPOC engine 50 in which the pistons are symmetrically arranged, i.e., with exhaust pistons 52, 52' inboard and intake pistons 54, 54' outboard, is shown. This arrangement facilitates short exhaust pipes into a turbocharger. Furthermore, the intake pistons can be identical, the exhaust pistons can be identical, and the right and left cylinder liners can be identical to reduce the number of unique parts in the engine and to reduce the engineering design and verification effort. However, one disadvantage of the piston configuration as shown in FIG. 3 is that the balance is disturbed slightly compared to engine 10 of FIG. 1 in which the pistons are asymmetrically arranged (as shown in FIG. 2, imbalance in the OPOC engine of FIG. 1 is slight). As will be discussed in more detail below, however, even the resulting imbalance in the engine configuration of FIG. 3 is small compared to a conventional in-line engine. Nevertheless, balance of the OPOC engine with symmetrical piston arrangement of FIG. 3 is degraded in comparison to the OPOC engine 10 in FIG. 1 with asymmetrical piston arrangement.

Due to the offset timing of the exhaust and intake pistons, for a short duration of crank rotation, in any of the cylinders in FIGS. 1 and 3, the two pistons move in the same direction. In engine 10, when the pistons in the left cylinder both move to the left, the pistons in the right cylinder both move to the right and vice versa. Such is not the case for engine 50 in FIG.

3. For a short duration, pistons 52', 54' in the left cylinder of engine 50 move in the same direction and pistons 52, 54 in the right cylinder move in the same direction as pistons 52', 54', thereby creating the unbalance.

Figure 4:
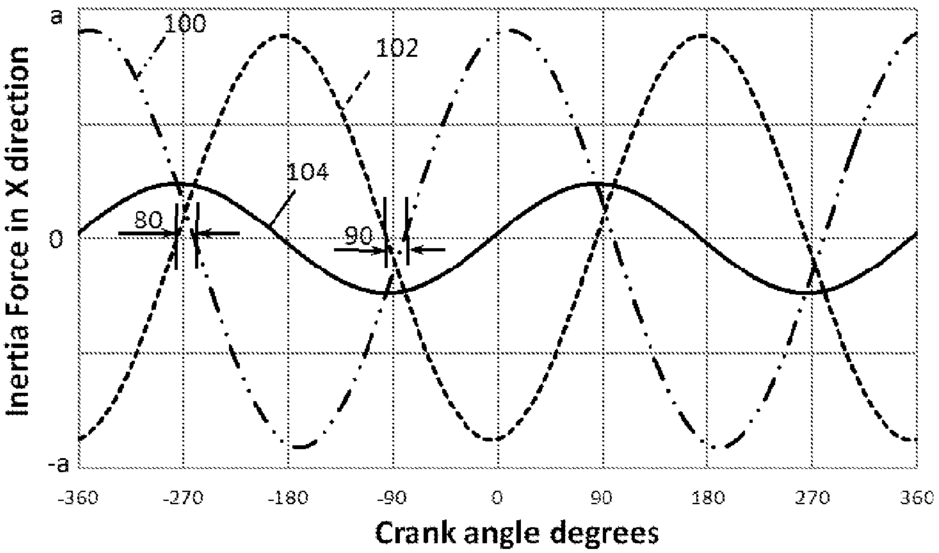
FIG. 4 is a graph of inertia forces due to the reciprocation of the pistons in the OPOC engine of FIG. 3 with no balancing measures.

The inertia force in the X direction due to the pistons' reciprocal movement in engine 50 is shown in FIG. 4. The inertia force due to reciprocation of exhaust pistons 52, 52' (at same engine speed of FIG. 2) is shown as curve 100. The inertia force of intake pistons 54, 54' at that same engine speed is shown as dashed curve 102. In region 80, at about −270 degrees crank angle, the inertia forces of both the pair of intake (outer) pistons and the pair of exhaust (inner) pistons are acting in the same direction (negative direction). In region 90, at about −90 degrees crank angle, the inertia of both pistons is once again acting in the same direction (positive). The resultant inertia force from all the pistons is shown in FIG. 4 as solid curve 104. Thus, although the inertia forces due to intake pistons 54, 54' largely cancel the inertia forces due to exhaust pistons 52, 52', a resultant unbalanced inertia force remains (curve 104).

Figure 5A:
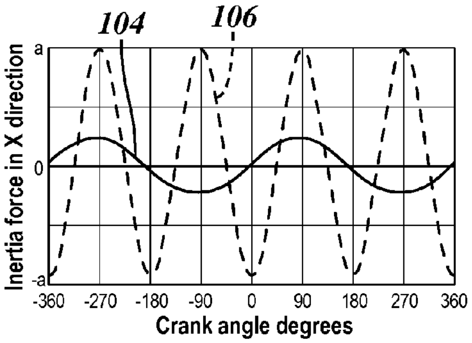
FIG. 5A is a graph showing inertia force in the X direction for the OPOC engine of FIG. 3 with no balancing measures compared with a conventional in-line, 4-cylinder diesel engine both at the same engine speed.

Although the resultant inertia forces 104 of engine 50 (FIG. 3) are greater than the nearly perfectly-balanced engine 10 (FIG. 1), the inertia forces 104 are, nevertheless, small compared to conventional engines. Resultant inertia forces 104 are plotted in FIG. 5A on the same scale as the graph in FIG. 4. Dashed curve 106 is the unbalanced inertia force for a comparable inline four-cylinder engine at the same engine speed. OPOC engine 50 has about one-quarter of the unbalanced inertia forces compared to that of a conventional inline, four-cylinder engine. The imbalance in OPOC engine 50 is a first-order imbalance, i.e., at crankshaft speed. The inertia force imbalance in the 1-4 engine is of second order, i.e., the imbalance has two periods in 360 crank degrees. Although the inertia force imbalance for the OPOC engine 50 with symmetrically-arranged pistons is quite small, there are applications in which the least amount of imbalance is desired, e.g., aviation applications, in which measures to lower the imbalance may be desired.

Figure 5B:
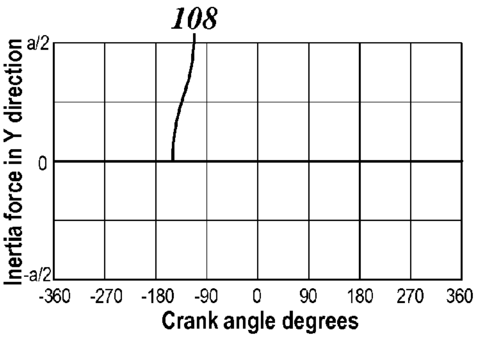
FIG. 5B shows the unbalanced force in the Y direction for the OPOC engine of FIG. 3 with no balancing measures.

There is no corresponding unbalanced inertia force in the Y direction for the unbalanced OPOC, as indicated by 108 in FIG. 5B, thus a straight line.

Referring now to FIG. 3, to overcome at least a portion of the imbalance, counterweights can be applied to a crankshaft 60. In one embodiment, separate counterweights are affixed to the crankshaft. Alternatively, crankshaft 60 is designed such that the center of gravity is offset, in relation to the axis of rotation. Due to the counterweighting, the center of gravity of crankshaft 60 is located substantially on a plane 56 perpendicular to the axis of rotation of the crankshaft (Z of FIG. 3) that includes the central axis (X of FIG. 3) of the two cylinders. The plane goes through the center journal. The counterweight can be made up of two smaller counterweights placed on the webs on either side of the center journal. In one embodiment, crankshaft 60 is slightly oversized in the manufacture in the area needing counterweighting. Then, in the machining process, the crankshaft can be balanced as desired by removing additional material. The counterweight(s) are not easily noticed on crankshaft 60 as it is part of the forged crankshaft, a unitary crankshaft. The discussion of forging the crankshaft and other machining processes are provided as an example and not intended to limit the disclosure.

An OPOC engine having offset cylinders, such as shown in FIG. 1, but with the pistons symmetrically arranged, such as shown in FIG. 3, is an alternative embodiment. In such embodiment, the plane on which the counterweight lies cannot be located along a central axis of the two cylinders as there is no one axis that is central to both cylinders. In such case, the plane in which the counterweight resides is between the two journals associated with the two pushrods (16 of FIG. 1).

Figure 6A:
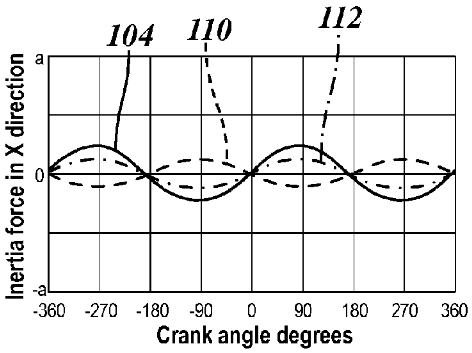
FIG. 6A is a graph of inertia force in the X direction for the unbalanced OPOC, the effects of adding a counterweight on the crankshaft; and the resulting unbalance after the counterweight is applied.
Figure 6B:
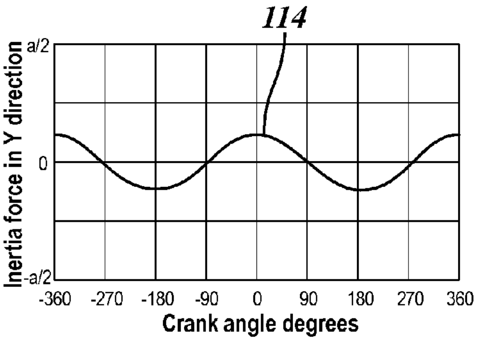
FIG. 6B is a graph of inertia force in the Y direction for the OPOC engine with a counterweight on the crankshaft.

The counterweights react against the unbalanced inertia force in the X direction as shown in FIG. 6A. The unbalance of the unbalanced engine is shown as curve 104. Counterweights to overcome about half of the imbalance have an effect shown as dashed curve 110. The resultant curve 112 is the sum of curves 104 and 112. Although curve 112 represents about a 50% improvement in remaining imbalance, the addition of counterweights on crankshaft 60 cause an imbalance in the Y direction that was previously balanced, which is shown as curve 114 in FIG. 6B. (The range in FIGS. 4, 5A, 6A, and 7A is −a to a and the range in FIGS. 5B, 6B, and 7B is −a/2 to a/2, the latter being a finer scale for illustration purposes.)

Figure 7A:
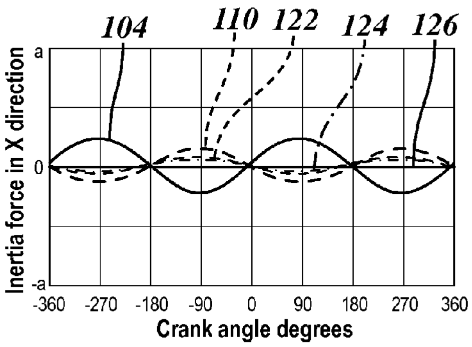
FIG. 7A is a graph of inertia force in the X direction for the unbalanced OPOC, the effects of adding a counterweight on the crankshaft and on engine accessories, and the resulting inertia forces when the counterweights are applied.

To overcome the inertial force in the Y direction that is introduced by the counterweight(s) on the crankshaft, counterweights may be added to accessories that rotate in the opposite direction, but as the same speed, as crankshaft 60. Not only do such counterweights on the accessories overcome the Y-direction imbalance introduced by the counterweight(s) on the crankshaft, but the accessory counterweights also overcomes the remaining inertial imbalance in the X direction as shown in FIG. 7A. Curve 104 is the imbalance of the OPOC engine without balancing measures and curve 110 shows the effect of the counterweighting of the crankshaft. Curves 122 and 124 show the effect of the counterweights on the accessories, each of which overcomes about half of the remaining imbalance 112 of FIG. 6A. Summing up the effect of the imbalance and the counterweights on the crankshaft and the accessories yields no imbalance in the X direction, which is shown as curve 126 in FIG. 7A.

Figure 7B:
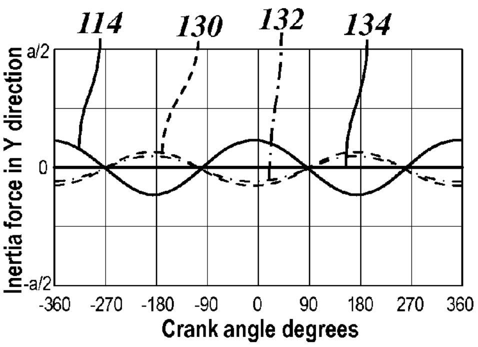
FIG. 7B is a graph of inertia force in the Y direction corresponding to the X direction inertia forces shown in FIG. 7A.

Referring to FIG. 7B, the imbalance in the Y direction is shown as curve 114. The effects of the counterweights on the accessories cause imbalances 130 and 132. The resultant of all of the forces in the Y direction yields curve 134. The result is a completely balanced engine in both the X and Y directions.

Figure 8:
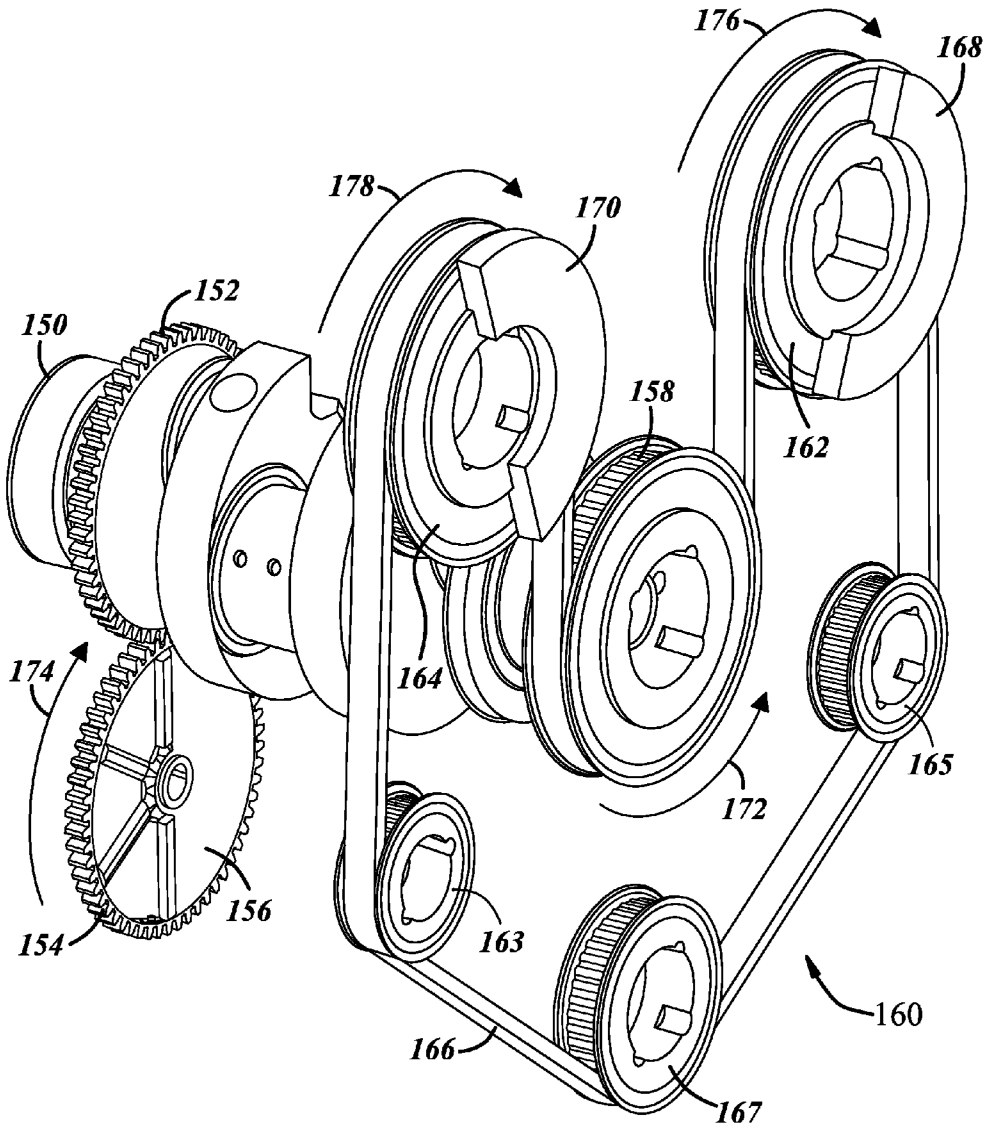
FIG. 8 is an isometric representation of an accessory drive according to one embodiment of the present disclosure.

In FIG. 8, an isometric representation of an accessory drive for an internal combustion engine is shown. Crankshaft 150 has a gear 152 that engages with a gear 154 that couples to an oil pump or other accessory (not shown). A counterweight 156 is coupled to gear wheel 154. Crankshaft 150 is also coupled to a pulley 158 that is part of a front end accessory drive system 160. A belt 166 engages with multiple pulleys 162, 163, 164, 165, and 167. Pulleys 162, 163, 164, 165, and 167 may be coupled to additional accessories such as: an air-conditioning compressor, a power-steering pump, and a water pump. Some of the pulleys may be idler pulleys. Furthermore, at least one belt tensioner may be included in the system. A counterweight 170 is applied to pulley 164 and a counterweight 168 is applied to pulley 162. Pulleys 162 and 164 are the same diameter as pulley 158 so that pulleys 162 and 164 counter rotate at crank speed. Gear 154 has the same number of teeth as gear 152 so that gear 154 counter rotates at crankshaft speed.

Crankshaft 150 rotates counter clockwise in FIG. 8 as shown by arrow 172. Gear 154, pulley 162, and pulley 164, rotate clockwise, as shown by arrows 174 and 176, and 178 thereby facilitating the counterweights associated with the gear and/or pulleys to counteract the imbalance created by the counterweighting of the crankshaft in the Y direction.

The counterweight(s) applied to crankshaft 150 overcomes about one-half of the inertia force imbalance of the pistons in the X direction but introduces an inertia force imbalance in the Y direction. Counterweight 156 on gear 154 is sized to overcome about one-quarter of the inertia force imbalance due to reciprocation of the pistons in the X direction. And, because gear 154 rotates in an opposite direction from crankshaft 150, it overcomes about one-half of the Y direction imbalance introduced by a counterweight on crankshaft 150. Counterweights 168 and 170 on pulleys 162 and 164, respectively, are sized to overcome about one-eighth of the inertia force imbalance due to reciprocation of the pistons. Again, because pulleys 162 and 164 rotate in the opposite sense of crankshaft 150, they collectively overcome about one-half of the Y direction imbalance introduced by a counterweight on crankshaft 1150. The engine is balanced with the set of counterweights as described.

Figure 9:
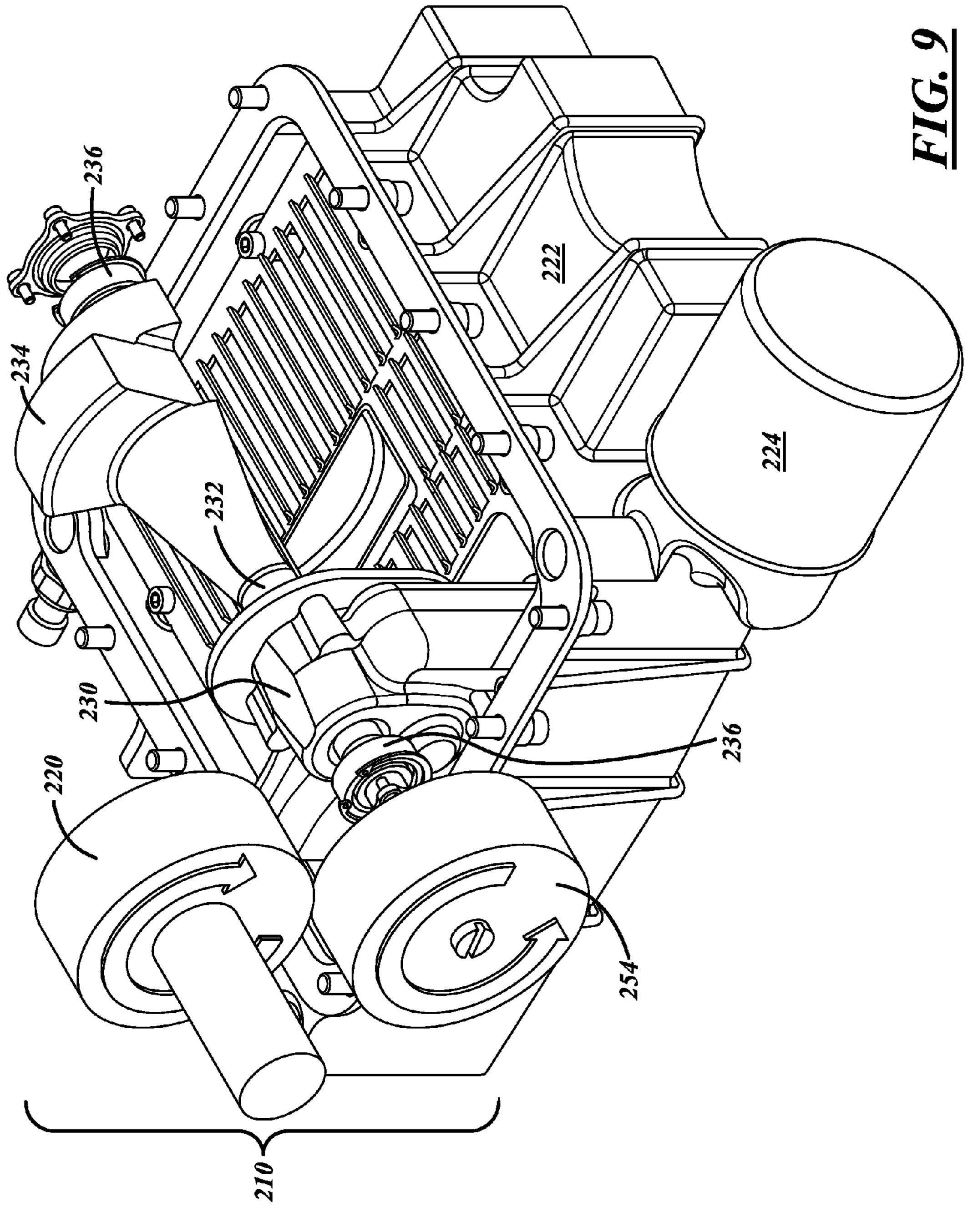
FIG. 9 is an isometric representation of a portion of an OPOC engine showing one embodiment of the present disclosure.

An alternative to putting counterweights on two accessories is shown in FIG. 9, in which a portion of an engine 210 is shown. A crankshaft 220 is shown rotating clockwise. A pulley 254 is driven via belt or chain (not shown) by crankshaft 220. Pulley 254 is coupled to an oil pump 230 and a shaft 232 having a counterweight 234. Alternatively, shaft 232 has a plurality of counterweights distributed along the length of shaft 232. Shaft 232 is supported near the ends by bearings 236. Counterweight 234 is located between bearing 236. Pulley 254 rotates at crankshaft 220 speed so that counterweight 234 can counterbalance a portion of the imbalance presented by the pistons in the X direction. Also, counterweight 234 can counterbalance a portion, or all, of the imbalance presented by a crankshaft counterweight in the Y direction.

Figure 10:
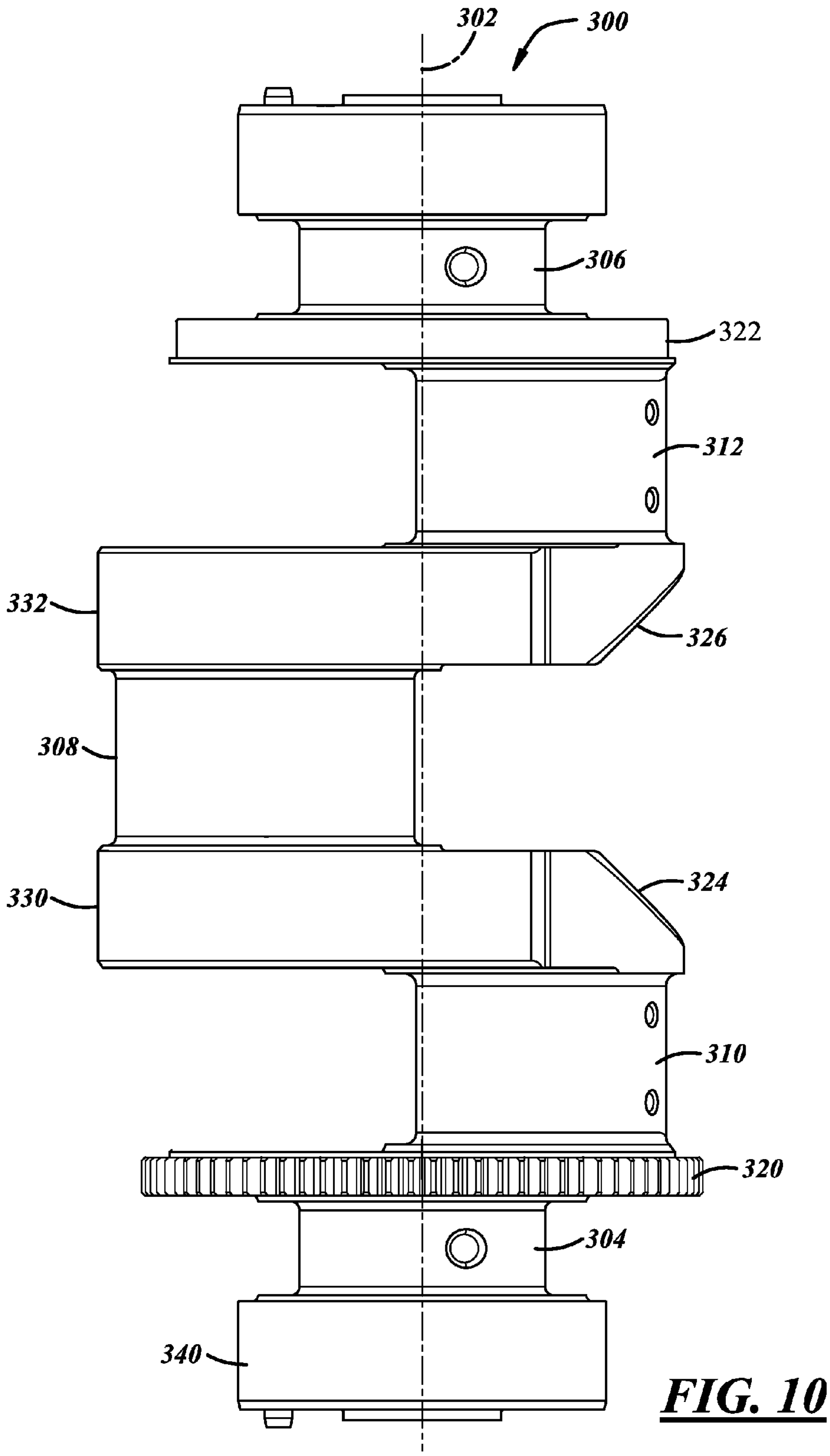
FIG. 10 illustrates a crankshaft rotating about an axis according to one embodiment of the present disclosure.

A crankshaft 300 that rotates about axis 302 according to an embodiment of the disclosure is shown in FIG. 10. Crankshaft 300 has a front main bearing 304 and a rear main bearing 306. Crankshaft 300 has three eccentric journals: center 308, front 310, and rear 312. Between bearings are webs: front outer web 320, rear outer web 322, front inner web 324, and rear inner web 326. Web 320 is machined into a gear which can be used to drive an accessory such as an oil pump. Counterweights 330 and 332 are included on webs 324 and 326, respectively. Crankshaft 300 is a unitary structure in FIG. 10. Alternatively, counterweights 330 and 332 can be affixed to crankshaft 300. Crankshaft 300 is one in which the cylinders are collinear, such as the engine in FIG. 3. A front end 340 of crankshaft 300 can be used to mount a pulley or other rotating member.

Figure 11:
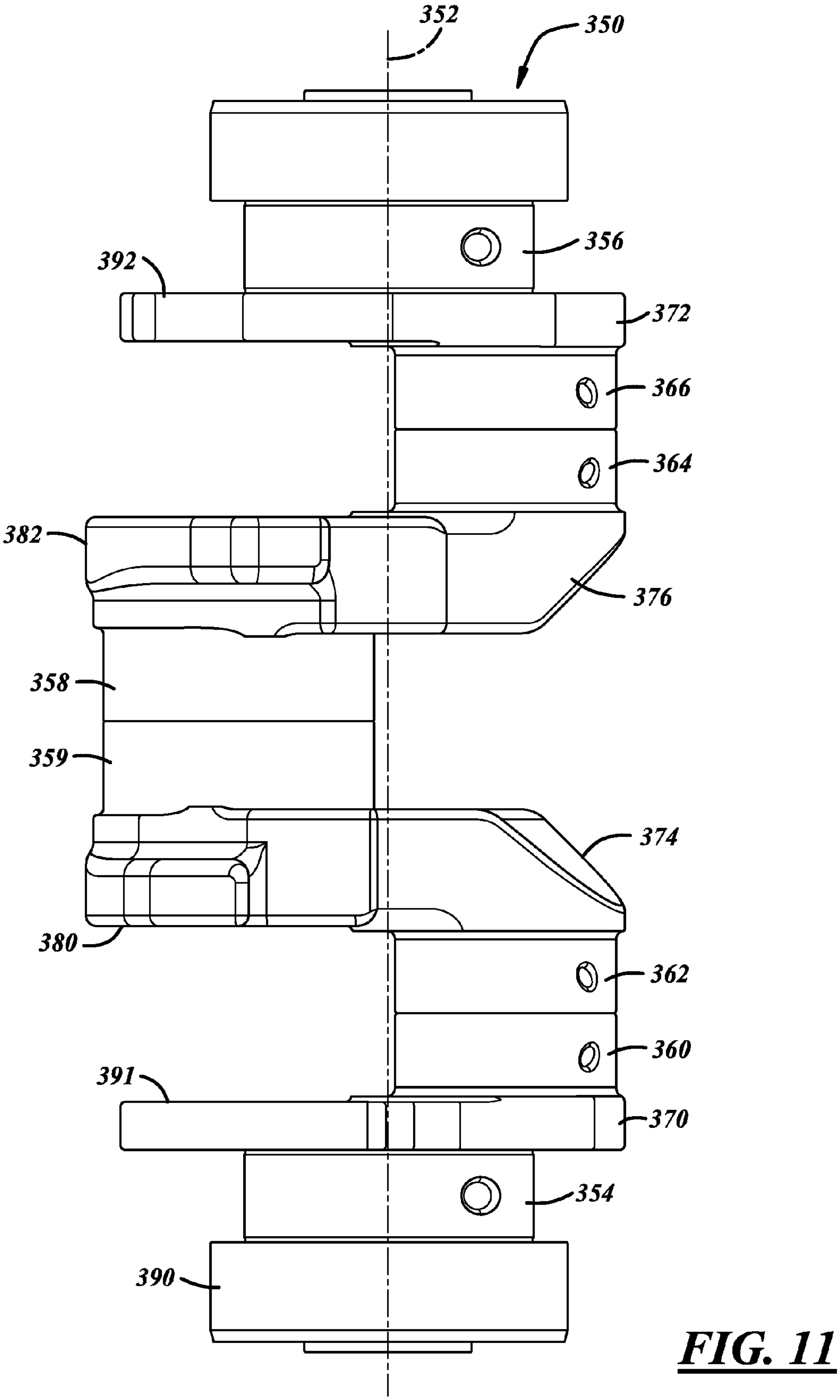
FIG. 11 illustrates a crankshaft rotating about an axis according to one embodiment of the present disclosure.

As described above, the present disclosure also applies to an engine in which the connecting rods couple to the crankshaft adjacent to each other, such as the engine in FIG. 1, except with the pistons arranged symmetrically. Such crankshaft 350 rotating about axis 352, shown in FIG. 11, has: a front main journal 354 and a rear main journal 356. In place of a single journal, crankshaft has two center eccentric journals 358 and 359. Similarly, there are two front eccentric journals 360 and 362 and two rear eccentric journals 364 and 366. Center eccentric journal 358 is coupled to one of the pushrods and the other center eccentric journal 359 is coupled to the other of the pushrods. Counterweights 380 and 382 are coupled to webs 374 and 376, respectively. In the embodiment in FIG. 11, counterweights 391 and 392 are included on front outer web 370 and rear outer web 372, respectively. The total counterweight of crankshaft 350 is made up of the sum of counterweights 380, 382, 391, and 392. In one alternative, crankshaft 300 of FIG. 10 is provided with four counterweights on the four webs, such as shown in FIG. 11. In another alternative, crankshaft 350 of FIG. 11 is provided with counterweights only on inner webs 374 and 376 and not on outer webs 370 and 372, similar to the counterweight configuration of FIG. 10.

An isometric view of crankshaft 300 is shown in FIG. 12 in which counterweights 330 and 332 are more easily viewed. Also, orifices in end 340 can also be viewed.

An alternative embodiment of a crankshaft 450 rotating about axis 452 is shown isometrically in FIG. 13. Crankshaft 450 has: front and rear main journals 454 and 456, respectively; front eccentric journals 460 and 462; center eccentric journals 458 and 459; and rear eccentric journals 464 and 466. Webs between journals, from front to back, are: front outer web 470, front inner web 474, rear inner web 476, and rear outer web 472. Crankshaft 450 has four counterweights: 491, 480, 482, and 492 that are associated with webs 470, 474, 476, and 472, respectively. Crankshaft 450 further includes a front end 490 to which a front end pulley or other rotating element may be coupled.

Figure 14A:
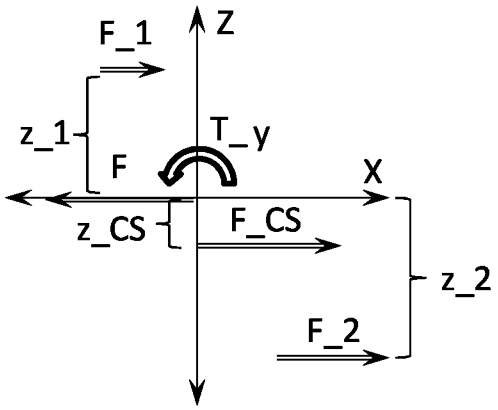
FIGS. 14A-D are free body diagrams for an OPOC engine of FIG. 3 for the following views, respectively: top view of the engine at 90 degrees after top dead center; front view of the engine at 90 degrees after top dead center; side view of the engine at bottom dead center; and front view of the engine at bottom dead center.

In FIG. 14A, which is a top view of the engine at 90 degrees after top dead center in one of the cylinders, the unbalanced inertia forces due to the pistons and the connecting rods is illustrated as F in the negative X direction. F acts along the X axis, therefore contributing no torque in the X-Z plane illustrated. Counterweights provided on the crankshaft exert a force, F_CS in the positive X direction, but displace from the origin in a negative Y direction, which will contribute to torque around the Y axis. Two counterweights that may be applied to accessories as described above, act in the positive X direction. The arrows indicating the magnitude and displacement of the forces from the X axis illustrate one possible configuration. The resultant torque due to the forces acting in the X direction, but displaced in the Y direction is shown as T_y. In FIG. 14B a free body diagram, as considered from the front of the engine, is illustrated at the same crank position as FIG. 14A. The piston and rod imbalance, F, lies on the X axis in this view as well. The imbalance introduced by the crankshaft counterweight(s) opposes F and also lies on the X axis in the X-Y plane shown. The counterweights on the accessories are both displaced in a negative Y direction. The resulting torque is T_z90 with the 90 signifying that it is at 90 degrees after top center. The unbalanced force is zero in the Y-Z plane, thus not shown in FIG. 14C. The forces due to the crankshaft, F_CS, and the accessory counterweights, F_1 and F_2, are shown, as well as the resulting torque with respect to the X axis, T_x. The forces and torque in the X-Y plane are shown in FIG. 14D.

By performing force balances on the free body diagrams in FIGS. 14A-D, the following equations can be constructed:

−F_CS+F__1+F__2=0;

z__1*F1+z__2*F__2+z_CS*F_CS=T_y;

−z1*F1−z__2*F__2+z_CS*F_CS=T_x;

z__1*F__1+z__2*F__2=T__z90; and

−x__1*F__1−x__2*F__2+T_zBDC.

Also assume that T_x=T_y.

Setting F_CS=F/2, the other variables are found to be:

F__1=(F_CS/(z__1−z__2))*z__2;

F__2=(F_CS/(z__1−z__2))*z__1;

T__y=F_CS*z_CS;

T__x=F_CS*z_CS;

T__z90 =(F_CS/(z__1−z__2))*(z__1*y__2−z__2*y__1); and

T__zBDC=(F_CS/(z__1−z__2))*(x__1*z__2−x__2*z__1).

By selecting values for the offsets for the counterweights, counterweight masses can be determined so that the OPOC engine can be fully balanced for some situations and nearly fully balanced for other situations.

Figure 14C:
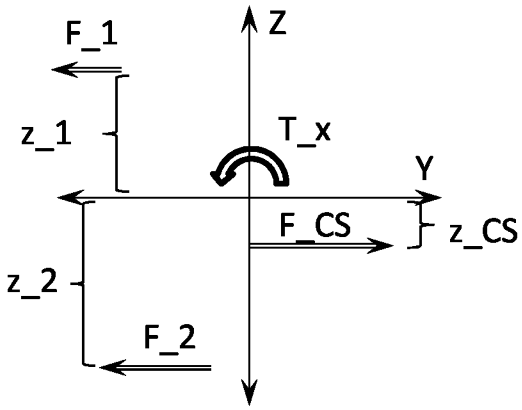
Figure 14B:
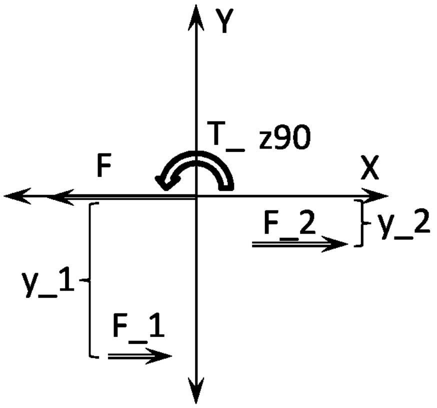
Figure 14D:
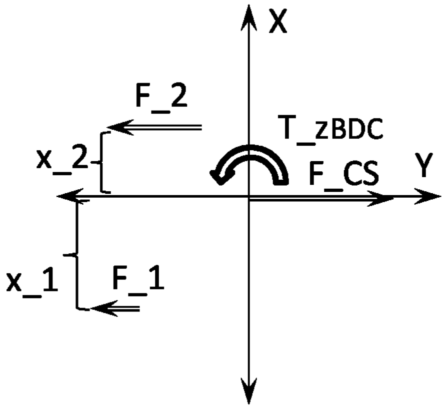

FIGS. 14C and 14D are taken at bottom dead center in the one cylinder. (Note that bottom dead center does not occur at exactly the same crank angle in both cylinders. Thus, the 90 degrees after top center of FIGS. 14A and 14B and the bottom dead center of FIGS. 14C and 14D all refer to crank position in one of the cylinders.)

Figure 15:
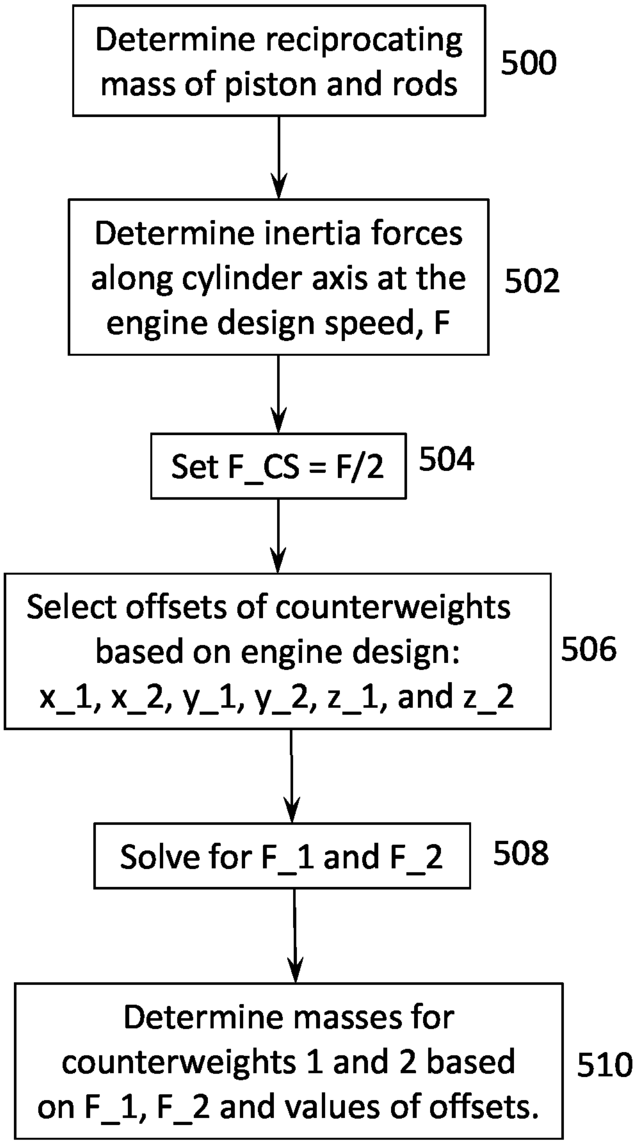
FIG. 15 is a flowchart showing an embodiment by which an OPOC engine having symmetrical pistons can be balanced.

In FIG. 15, a process by which the engine can be balanced is shown in a flowchart. In 500, the reciprocating mass of the piston and the translatory component of the connecting rods is measured or estimated. In 502, the resultant inertia force along the cylinder axis at the engine design speed (F) is determined. The F_CS, i.e., the inertia force due to the crankshaft counterweights is assumed to be one-half of the total imbalance due to the pistons and rods (block 504). This one-half relationship is not intended to limit the present disclosure. The offsets of the counterweights that can be applied to the accessories are limited by the particular engine design in that the counterweights should not interfere with other rotational components in the engine. Thus, based on the engine design, i.e., all of the other moving components, probable locations to apply counterweights can be determined. Such offsets are selected in block 506. In block 508, F_1 and F_2 are determined via the above set of equations. Based on F_1 and F_2 and the offsets selected in block 506, the masses of the counterweights can be determined in block 510.

In one special case: y_CS=0; x_1=−x_2; y_1=−y_2; z_1=−z_2; and F_CS=F/2. In this case, P_1=P_2=F/4. The remaining torques are all zero. In a first sample case: y_CS=0; x_1=x_2=0; z_2=−1.9*z_1; y_1=−1.4*z_1; y_2=(z_2/z_1)*y_1; and F_CS=F/2. In this case, the results are approximately, P_1=F/3 and P_2=F/6 with the remaining torques all zero. And in yet another sample case with the values the same as in the first sample case except that x_1=x_2=0.839*y_1. The results for P_1 and P_2 are approximately the same: P_1=F/3 and P_2=F/6, but there is a remaining torque, T_zBDC which acts in the direction of the peak torque from the gas forces due to combustion in the cylinder.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. An internal combustion engine, comprising:

a first cylinder having a central axis;

a second cylinder having a central axis parallel to the central axis of the first cylinder;

a unitary crankshaft situated between the two cylinders and having at least five journals and four webs:

a front main journal having a central axis collinear with an axis of rotation of the crankshaft;

a rear main journal having a central axis collinear with the axis of rotation of the crankshaft;

a central eccentric journal;

a front eccentric journal between the front main journal and the central eccentric journal;

a rear eccentric journal between the rear main journal and the central eccentric journal;

a front outer web located between the front main journal and the front eccentric journal;

a front inner web located between the front eccentric journal and the central eccentric journal;

a rear inner web located between the central eccentric journal and the rear eccentric journal;

a rear outer web located between the rear eccentric journal and the rear main journal; wherein:

a central axis of the front and rear eccentric journals is offset from the axis of rotation by an outer crank throw;

a central axis of the central journal is offset from the axis of rotation by an inner crank throw;

the front and rear eccentric journals are substantially equally phased; and the central eccentric journal is asymmetrically phased with respect to the front and rear eccentric journals;

the engine further comprising:

a first piston disposed in the first cylinder and coupled to the central eccentric journal via a first pushrod;

a second piston disposed in the second cylinder and coupled to the central eccentric journal via a second pushrod;

a third piston disposed in the first cylinder and coupled to the front eccentric journal via a first pullrod and coupled to the rear eccentric journal via a second pullrod; and a fourth piston disposed in the second cylinder and coupled to the front eccentric journal via a third pullrod and coupled to the rear eccentric journal via a fourth pullrod, wherein:

reciprocation of the pistons, the pushrods, and the pullrods generates an unbalanced inertia force;

the front inner web includes a first counterweight;

the rear inner web includes a second counterweight;

the first and second counterweights cause the center of gravity to be displaced from the axis of rotation of the crankshaft to at least partially counteract the unbalanced inertia force;

a crankshaft pulley coupled to the crankshaft;

an accessory pulley counter rotating at the same speed as the crankshaft pulley with the crankshaft pulley and the accessory pulley engaged via a flexible member;

an accessory shaft and an accessory coupled to and rotating with the accessory pulley; and a counterweight coupled to the accessory shaft.

2. The engine of claim 1 wherein the first and second counterweights are situated to provide clearance between the counterweights and first and second pistons at all crankshaft positions.

3. The engine of claim 1 wherein the first and second counterweights counteract approximately half of the unbalanced inertia force.

4. The engine of claim 1 wherein:

the front outer web includes a third counterweight;

the rear outer web includes a fourth counterweight;

the center of gravity of the crankshaft is displaced from the central axis due to the first, second, third, and fourth counterweights; and the displacement of the center of gravity is situated to overcome approximately half of the inertia force.

5. The engine of claim 1 wherein:

the first and second pistons are exhaust pistons arranged to reciprocate when the crankshaft rotates;

the third and fourth pistons are intake pistons arranged to reciprocate when the crankshaft rotates;

the first and second pistons weigh less than the third and fourth pistons; and the outer crank throw is shorter than the inner crank throw such that:

(the mass of first piston plus a translatory component of the mass of the pushrod) times the outer crank throw is substantially equal to (the mass of the third piston plus a translatory component of the mass of the first and second pullrods) times the inner crank throw.

6. The engine of claim 1 wherein the first and second cylinder central axes are substantially collinear and the center of gravity of the crankshaft is located substantially on a plane perpendicular to the axis of rotation of the crankshaft that includes the central axes of the two cylinders.

7. The engine of claim 1, further comprising:

at least one accessory coupled to the engine with a shaft of the accessory parallel to the crankshaft and the shaft of the accessory rotating in an opposite direction with respect to the crankshaft at the same rotational speed as the crankshaft; and at least one counterweight coupled to the at least one accessory wherein the at least one counterweight on the at least one accessory has a mass and a location with respect to the axis of rotation of the respective accessory canceling a portion of the unbalanced inertia force due to the pistons.

8. The engine of claim 1, further comprising: a serpentine member that couples with the crankshaft and a pulley coupled to the at least one accessory wherein the serpentine member is one of a toothed belt and a chain.

9. The engine of claim 1, wherein the at least one accessory comprises at least one of an oil pump, a water pump, an alternator, a fuel pump, an air conditioning compressor, and an air pump.

10. An internal combustion engine system, comprising:

a crankshaft having at least five journals and four webs:

a front main journal having a central axis collinear with an axis of rotation of the crankshaft;

a rear main journal having a central axis collinear with the axis of rotation of the crankshaft;

a central eccentric journal;

a front eccentric journal between the front main journal and the central eccentric journal;

a rear eccentric journal between the rear main journal and the central eccentric journal;

a front outer web located between the front main journal and the front eccentric journal;

a front inner web located between the front eccentric journal and the central eccentric journal;

a rear inner web located between the central eccentric journal and the rear eccentric journal;

a rear outer web located between the rear eccentric journal and the rear main journal;

a first cylinder having a first piston reciprocating therein, the first piston coupled to the crankshaft via a first connecting rod;

a second cylinder having a second piston reciprocating therein, the second piston coupled to the crankshaft via a second connecting rod;

a third piston reciprocating in the first cylinder, the third piston coupled to the crankshaft via third and fourth connecting rods;

a fourth piston reciprocating in the second cylinder, the fourth piston coupled to the crankshaft via fifth and sixth connecting rods;

a crankshaft pulley coupled to the crankshaft;

an accessory pulley counter rotating at the same speed as the crankshaft pulley with the crankshaft pulley and the accessory pulley engaged via a flexible member; and a an accessory counterweight coupled to the accessory pulley.

11. The engine system of claim 10, the engine system further comprising:

a first counterweight applied to the rear inner web;

second counterweight applied to the rear inner web;

wherein reciprocation of the pistons lead to unbalanced inertia forces perpendicular to the axis of rotation of the crankshaft; the first and second counterweights cause the center of gravity of the crankshaft to be displaced in such a manner to counteract at least a portion of the unbalanced inertia forces, the engine further comprising:

a primary accessory coupled to the engine with the primary accessory counter rotating at crankshaft speed; and a third counterweight coupled to the primary accessory wherein the third counterweight causes center of gravity of the primary accessory to be displaced from an axis of rotation of the primary accessory.

12. The engine system of claim 11, further comprising:

a secondary accessory coupled to the engine with the secondary accessory counter rotating at crankshaft speed; and a fourth counterweight associated with the secondary accessory wherein the fourth counterweight causes center of gravity of the secondary accessory to be displaced from an axis of rotation of the secondary accessory; the first and second counterweights counteract about half of the unbalanced force; the first and second counterweights lead to an imbalance in a direction perpendicular to both the axis of the first cylinder and the axis of rotation of the crankshaft; and the third and fourth counterweights counteract about half of the unbalanced force due to the pistons and the translatory component of the connecting rods as well as counteracting the imbalance created by the first and second counterweights.

13. The engine system of claim 10, further comprising:

a first counterweight applied to the front inner web;

a second counterweight applied to the rear inner web;

a crankshaft pulley coupled to the crankshaft;

a serpentine member wrapped around a portion of the crankshaft pulley;

a first rotating accessory having an axis of rotation parallel to an axis of rotation of the crankshaft and a first accessory pulley engaged with the serpentine member;

a second rotating accessory having an axis of rotation parallel to the axis of rotation of the crankshaft and a second accessory pulley engaged with the serpentine member;

a third counterweight coupled to the first rotating accessory; and a fourth counterweight coupled to the second rotating accessory.

14. The engine system of claim 10, further comprising:

a cylinder block housing first and second cylinders in which first and second pistons reciprocate;

a driving gear associated with the crankshaft;

a driven gear engaging with the driving gear with the driven gear having the same number of teeth as the driving gear;

an accessory shaft and an accessory coupled to and rotating with the driven gear; and a counterweight coupled to the accessory shaft.

15. The engine of claim 14 wherein the accessory shaft associated with the accessory is supported on a first end by a first bearing in a first side of the cylinder block and is supported on a second end by a second bearing in a second side of the cylinder block; the counterweight coupled to the accessory shaft is located between the two bearings.

16. The engine of claim 14 wherein the first and second connecting rods are pushrods that couple to the crankshaft adjacent to each other; the third and fourth connecting rods are pullrods that couple to the crankshaft adjacent to each other; the fifth and sixth connecting rods are pullrods that couple to the crankshaft adjacent to each other; the central eccentric journal comprises two journal portions, one to which the first connecting rod couples and one to which the second connecting rod couples; the front eccentric journal comprises two journal portions, one to which the third connecting rod couples and one to which the fourth connecting rod couples; and the rear eccentric journal comprises two journal portions, one to which the fifth connecting rod couples and one to which the sixth connecting rod couples.

17. The engine of claim 10, further comprising:

a crankshaft pulley coupled to the crankshaft;

an accessory pulley counter rotating at the same speed as the crankshaft pulley with the crankshaft pulley and the accessory pulley engaged via a flexible member;

an accessory shaft and an accessory coupled to and rotating with the accessory pulley; and a counterweight coupled to the accessory shaft.

18. An internal combustion engine, comprising:

a first cylinder having a central axis;

a second cylinder having a central axis parallel to the central axis of the first cylinder;

a unitary crankshaft situated between the two cylinders and having at least five journals and four webs:

a front main journal having a central axis collinear with an axis of rotation of the crankshaft;

a rear main journal having a central axis collinear with the axis of rotation of the crankshaft;

a central eccentric journal;

a front eccentric journal between the front main journal and the central eccentric journal;

a rear eccentric journal between the rear main journal and the central eccentric journal;

a front outer web located between the front main journal and the front eccentric journal;

a front inner web located between the front eccentric journal and the central eccentric journal;

a rear inner web located between the central eccentric journal and the rear eccentric journal;

a rear outer web located between the rear eccentric journal and the rear main journal; wherein:

a central axis of the front and rear eccentric journals is offset from the axis of rotation by an outer crank throw;

a central axis of the central journal is offset from the axis of rotation by an inner crank throw;

the front and rear eccentric journals are substantially equally phased; and the central eccentric journal is asymmetrically phased with respect to the front and rear eccentric journals;

the engine system further comprising:

a first piston disposed in the first cylinder and coupled to the central eccentric journal via a first pushrod;

a second piston disposed in the second cylinder and coupled to the central eccentric journal via a second pushrod;

a third piston disposed in the first cylinder and coupled to the front eccentric journal via a first pullrod and coupled to the rear eccentric journal via a second pullrod; and a fourth piston disposed in the second cylinder and coupled to the front eccentric journal via a third pullrod and coupled to the rear eccentric journal via a fourth pullrod;

a crankshaft pulley coupled to the crankshaft;

an accessory pulley counter rotating at the same speed as the crankshaft pulley with the crankshaft pulley and the accessory pulley engaged via a flexible member; and a a counterweight coupled to the accessory pulley, wherein:

reciprocation of the pistons, the pushrods, and the pullrods generates an unbalanced inertia force; and the crankshaft has a center of gravity displaced from the axis of rotation of the crankshaft to at least partially counteract the unbalanced inertia force.

19. The engine of claim 18 wherein the center of gravity of the crankshaft is located substantially on a plane perpendicular to the axis of rotation of the crankshaft and includes the central axis of at least one of the cylinders.

* * * * *